United States Patent [19]
Hock et al.

[11] 3,785,714
[45] Jan. 15, 1974

[54] SPLIT-FIELD MICROSCOPE

[75] Inventors: Fromund Hock, Wetzlar; Hennig Feldmann, Muenchholzhausen; Heinz Fialkowski, Wetzlar, all of Germany

[73] Assignee: E. Leitz GmbH, Wetzlar, Germany

[22] Filed: Oct. 12, 1971

[21] Appl. No.: 188,307

[30] Foreign Application Priority Data
Oct. 19, 1970 Germany.................. P 20 51 174.4

[52] U.S. Cl...................... 350/15, 350/30, 356/168
[51] Int. Cl. ............................................. G02b 21/18
[58] Field of Search ..... 350/12–15, 30, 35, 36, 147, 350/152, 157, 156, 163; 356/168

[56] References Cited
UNITED STATES PATENTS

| | | | |
|---|---|---|---|
| 3,523,736 | 8/1970 | Bottomley | 356/156 |
| 2,732,760 | 1/1956 | Rantsch | 356/168 |
| 3,481,673 | 12/1969 | Freeman | 350/30 |
| 2,318,705 | 5/1943 | Morgan | 350/15 |
| 3,450,480 | 6/1969 | Chitayat | 350/35 |
| 3,547,513 | 12/1970 | Sheiner | 350/30 |
| 2,097,762 | 11/1937 | Heine | 350/15 |
| 2,255,631 | 9/1941 | Schulman | 350/14 |
| 2,128,394 | 8/1938 | Berek | 350/15 |
| 3,007,371 | 11/1961 | Tallman | 350/15 |
| 3,620,593 | 11/1971 | Tackaberry | 350/14 |

Primary Examiner—David H. Rubin
Attorney—Krafft & Wells and Gilbert L. Wells

[57] ABSTRACT

The split-field microscope of the present invention has a polarizer in the illuminator, a polarizing beam splitter for simultaneous or alternative illumination of both object fields, equal optical path lengths for the polarized split partial beams between splitting and reunion, means for deflecting the polarized partial beams in the direction toward parallel-disposed objectives and a quarter-wave plate disposed in each illuminating beam path. The imaging ray beams are passed backwards through the aforementioned components up to the central prism and a tube lens system and an ocular, connected after the central prism, are transited by the combined imaging beams.

13 Claims, 7 Drawing Figures

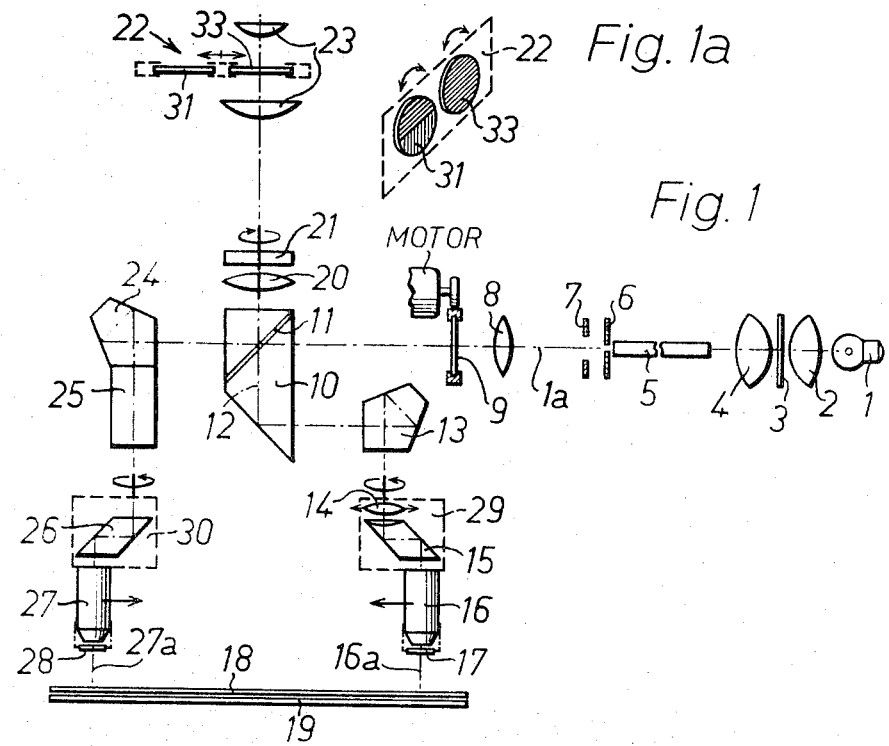
Fig. 1a
Fig. 1
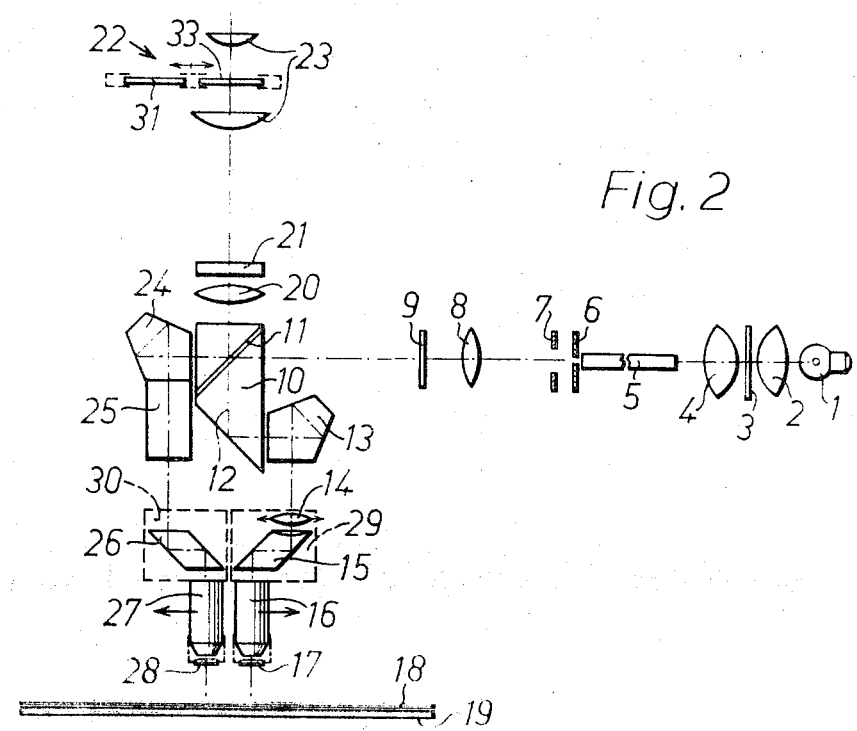
Fig. 2

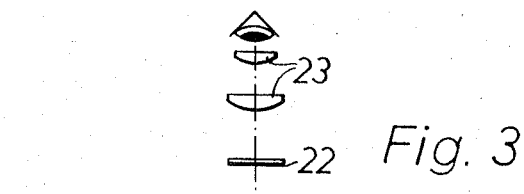
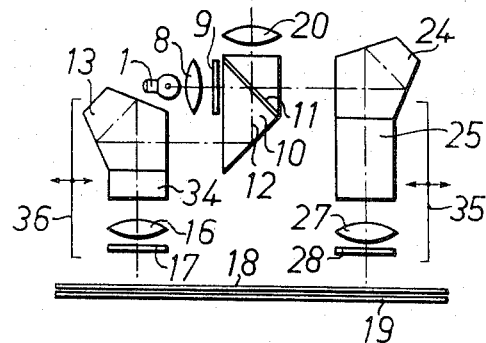
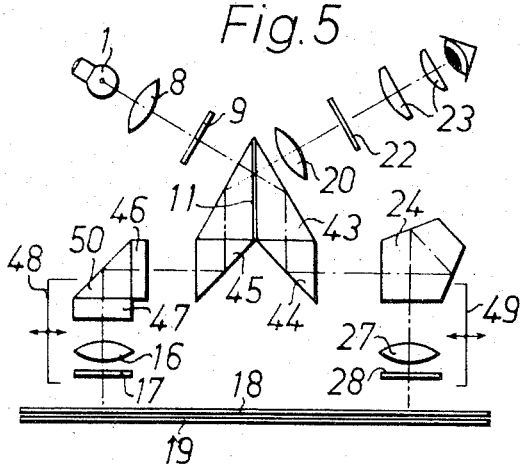
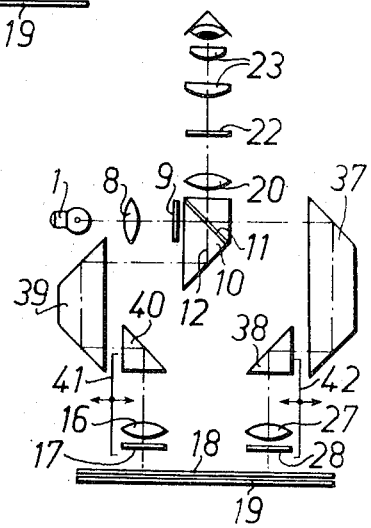
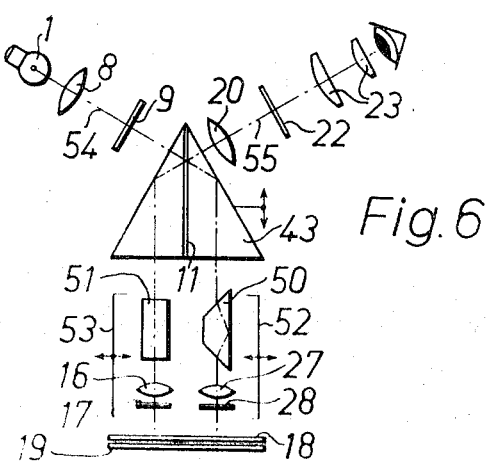

SPLIT-FIELD MICROSCOPE

BACKGROUND OF THE INVENTION

The field of the invention is compound lens systems with plural optical axes having a common axis portion with an axis interceptor to shift from one axis to another.

The present invention is particularly concerned with a split-field microscope wherein two objectives, each of which forms an image of the same plane, have a variable spacing and have a common illuminating device for both object fields.

These split-field microscopes are used to an increasing extent for comparison and positioning purposes, especially in semiconductor technology.

In this connection, it is important, for example, to exactly align working masks, emulsion masks, color masks, or chromium masks on silicon or germanium wafers.

In order to fulfill these requirements, it is known to the prior art to use a mask adjusting microscope according to the principle of a comparison microscope wherein by using one objective at a time two points of the object are imaged side-by-side into respective viewing halves of the ocular.

In another prior art split-field microscope, a central prism is disposed to be displaceable so that either the left or the right object image is reproduced in the focal plane of the ocular. In the central position of these prisms, a left partial image and a right partial image are viewed simultaneously. The illuminator is concomitantly moved in case of changes in distance of both objectives.

Finally, a split-field microscope with an asymmetrical beam path is known from German Democratic Republic Pat. No. 62,166, wherein the illumination of both halves of the object is effected by a light source and a semi-transparent mirror. As a result of the asymmetrical course of the ray, the image of the aperture diaphragm of the illuminator assumes different positions with respect to the pupils of the two objectives. Thereby, the exit pupils behind the oculars appear to be different sizes. Since the eye exhibits differing properties in the various zones of the pupil, when it is observing a positioning procedure, the congruence of a mask and semiconductor wafer is impaired, depending on eye imperfections. Besides, the vignetting in the fields can be different.

A further disadvantage of this prior art split-field microscope resides in that 50 percent of the light is lost on the polarizers arranged on the image side in front of the objectives. Furthermore, when a polarization anisotropy of the objects prevails, the object contrast of both objectives can be different.

Other prior art split-field microscopes exhibit the disadvantages that, on the one hand, they possess two or more illuminating lamps which strongly heat the device. On the other hand, there is no possibility for the installation of cross hairs or marker diaphragms into the light flux. Furthermore, only partial images can be seen in the ocular; and finally, merely an inaccurate, non-distrotion-free arrest of the objectives set to a selected distance is possible.

SUMMARY OF THE INVENTION

Having in mind the limitations of the prior art, it is an object of the present invention to provide an improved split-field microscope for a broadened range of application.

This object is attained by providing a polarizer in the illuminator, a polarizing beam splitter for simultaneous or alternative illumination of both object fields, equal optical path lengths for the polarized split beams between splitting and reunion, means for deflecting the polarized partial beams in the direction toward the parallel-disposed objectives, a quarter-wave plate disposed in each illuminating beam path, and by passing the imaging ray beams backwards through the aforementioned components up to the central prism, and connecting after the central prism a tube lens system and an ocular transited by the combined imaging beams.

In order to adapt the two objectives of the split-field microscope to the size of the object to be examined, means are provided for varying the relative distances between the middle axis of the central prism and the aiming axes of the objectives. In accordance with a further feature of the invention, each objective can be, respectively, one structural unit with a beam-shifting component connected in front of the objective and a quarter-wave plate connected after the objective. Each structural unit is, in each instance, disposed to be rotatable about the axis of symmetry of the polarized illuminating beam exiting from the respective beam-deflecting component. Besides, it is possible to fashion these structural units so that they can be inserted with varying orientations. Furthermore, the polarizer can be mounted to be rotatable, and the analyzer can consist of two polarizing fields oriented at right angles to each other.

In a further embodiment, it is possible to provide an analyzer changer consisting of an analyzer made up of two polarizing foils oriented at right angles to each other with respect to their directions of transmission and an analyzer made up of one polarizing foil. Furthermore, the illuminating device can comprise a light conductor, and a reference marker can be provided in the path of the illuminating beam which is conjugated with respect to the object planes. These images form, comparable to a protractor, a standard distance which can be fine-adjusted by means of an internal shifting lens.

The tube lens system can consist of a combination of at least one isotropic lens and a plane-parallel isotropic plate which can be inserted in and removed from the imaging beam path, or of a combination of at least one isotropic lens and an anisotropic crystal plate, or of a combination of at least one isotropic lens and at least one anisotropic crystal lens.

The advantages attained by the present invention reside particularly, in that it is possible to obtain:

with only one illuminating device, a light efficiency which is improved at least twofold;

a suppression of the disturbing scattered light produced in the optical components;

a possibility of installing cross-hairs into the beam path;

a sensitive distance adjustment of the aiming axes given by the nodal points of the objectives and the cross-hair of the ocular, with an extensive elimination of the errors produced by any inaccuracies in alignment;

equal path lengths for the polarized split beams between splitting and reunion;

an exact arresting of the objectives adjusted to the selected distance;

an imaging system with two axially different object planes; and partial or mixed images of the object fields reproduced by both objectives.

BRIEF DESCRIPTION OF THE DRAWINGS

FIG. 1 is a schematic representation of an embodiment of the present invention at a maximum distance of both objectives;

FIG. 1a is a detailed showing of the analyzer of FIG. 1;

FIG. 2 shows the representation of FIG. 1, at a minimum distance of both objectives;

FIGS. 3 and 4 are schematic representations showing alternative embodiments of FIG. 1 wherein the objectives are combined into displaceable structural units; and FIGS. 5 and 6 are schematic representations showing alternative embodiments of FIG. 1 incorporating double prisms with vertically arranged polarizing splitting layers.

DESCRIPTION OF THE PREFERRED EMBODIMENTS

In FIG. 1, a beam of illuminating rays emanating from the light source 1 and having an optical axis 1a impinges on the polarizer 9, after passing through a field lens 2, a heat insulating filter 3, and a collimator 4, via a light conductor 5 followed by an aperture disphragm 6 as well as an illuminating field stop 7, and then via a further lens 8. The polarizer 9 is rotatably arranged. The linearly polarized light beam then impinges on the polarizing splitting layer 11 of the central prism 10. This polarizing splitting layer 11 has the property either to transmit partially or entirely, or to deflect partially or entirely, an impinging, linearly polarized beam, depending on the direction of oscillation thereof relative to the principal direction of polarization of the prism.

Assuming that the polarized beam of illuminating light is entirely reflected on the polarizing splitting layer 11, the beam extends along the middle axis 12 of the central prism 10 and, after a renewed reflection, is guided via a pentaprism 13 which deflects the linearly polarized beam of rays by 90°, so that the beam now passes, via a displaceable lens 14 and a rhomboid prism 15 having a ray-shifting effect, into the objective 16 with an aiming axis 16a. The linearly polarized beam is circularly polarized after passage through a quarter-wave plate 17 disposed at an angle of 45° between the direction of oscillation of the light and the principal direction of oscillation thereof, and impinges on the object 18.

The beam of light reflected on the object is likewise circularly polarized and again becomes a linearly polarized beam after passage through the quarter-wave plate, due to a renewed phase shift. However, the plane of oscillation of this light beam is changed by 90° with respect to that of the illuminating light beam. The above described structural components are transited by this linearly polarized imaging beam in the reverse direction up to the polarizing splitting layer 11. Due to the fact that the plane of oscillation is shifted by 90°, the beam now penetrates this layer unhindered and is conducted to the ocular 23 via a tube lens system illustrated in the figure by a lens 20 and a plano-parallel plate 21 disposed therebehind. In the observation beam path, an analyzer is furthermore arranged. As shown in FIG. 1a, two different analyzers 31, 33, mounted on a common analyzer changer 22, are provided.

Let us now consider the case wherein the polarizer 9 is rotated by an angle of 90°. Here, the linearly polarized beam of light rays emanating therefrom exhibits such a plane of oscillation that it can pass unhindered through the polarizing splitting layer 11 and passes, via a pentaprism 24, a compensating prism 25, and a beam-deflecting rhomboid prism 26, to the second objective 27 with the quarter-wave plate 28 connected thereafter and from there to the object 18 with aiming axis 27a. The returning circularly polarized imaging beam again is converted into linearly polarized light with the plane of oscillation shifted by 90°, so that the beam is now reflected on the polarizing splitting layer in the direction toward the ocular.

Thus, it is possible to observe, depending on the respective position of the polarizer 9, either object details by way of the objective 16, or, after rotating the polarizer 9 by 90°, object details only by way of the objective 27, or, with a rotation of the polarizer 9 by 45°, object details simultaneously with identical light intensity via both partial beam paths. For this purpose, indexing devices, which are not shown, are provided at the polarizer 9 for the exact setting of the polarizer into desired angular positions.

By the projection of the marker of a marker diaphragm insertable in the illuminating field stop 7, a fixed distance transferable to the objects is given via the spacing of the aiming axes of the objectives.

The objective 16 can form a structural unit 29 with the quarter-wave plate 17 and the rhomboid prism 15 with the internal shifting lens 14. The components 26–28 can likewise constitute a structural unit 30.

In order to set the distance of the aiming axes given by the nodal points of the objectives and the marker, means are provided, which are not shown, permitting the variation of the relative distances between the components 24, 25; 10 and 13, and thus the structural units 29 and 30 with respect to each other.

In this connection, equal optical path lengths for the polarized split beams between splitting and reunion are preserved.

Besides, the structural units 20 and 30, respectively, can be disposed to be rotatable about the axes of the polarized illuminating beam emanating from the pentaprism 13 and the compensating prism 25, respectively.

It is possible to employ, in place of devices for the rotation of the structural units, other means making it possible to attach these structural units 29, 30 with varying orientation with respect to the object plane.

As can be seen, the structural unit 29 comprises an internal shifting lens 14 inserted therein, which lens makes it possible to subject the beam path to a tilt for fine adjustment.

The unwanted reflected light components from the structural parts between the polarizing splitting layer 11 and the quarter-wave plates 17, 28 are preserved in their direction of oscillation and thus are not conducted, by the polarizing splitting layer 11, into the ocular 23 via the tube lens system 20, 21.

The optics of the tube lens system 20, 21 can be fashioned, as set forth hereinbelow, so that two different planes 18, 19 in the object space can be observed either simultaneously or successively in a sharp image, without having to effect an additional focusing procedure at the objectives.

If an isotropic plane-parallel plate 21 is inserted behind a conventional microlens system 20, the beam path is altered, along the lines that a different object plane is sharply reproduced. Once the plate 21 is again withdrawn, the original object plane is again reproduced in a sharp image. The plane-parallel plate 21 can also consist of an anisotropic crystalline material, e.g. calcite or quartz, wherein the optical axis of the crystal is in each case parallel with respect to the two plane surfaces. The linearly polarized light beam coming from the polarizing splitting layer 11 impinges upon the crystal plate 21, cut in an oriented manner. This light beam having just left the lens system 20, is split into two linearly polarized components, due to the anisotropy of the crystal and the planes of oscillation of these last-mentioned components are at right angles to each other. In order to be able to regulate the split-up components, caused by the anisotropic structural elements, with respect to their partial image planes, the structural elements are rotatably mounted.

The components, influenced by the two different indices of refraction $n_e$ and $n_o$ ($n_e \neq n_o$), pass through the plate 21 at different velocities, so that a difference in path results therefrom which is dependent on the thickness of the plate 21.

If a normal analyzer 33 disposed on the analyzer changer 22 is inserted into the beam path, this analyzer transmits only the beam portion, the plane of oscillation of which is in parallel to the transmission direction of the analyzer foil. Depending on the position in azimuth of the analyzer 33, the component being influenced by the index of refraction $n_e$, or the component being influenced by the index of refraction $n_o$ can thus be observed through the eyepiece. This means that it is possible to focus selectively on the object plane 18 or the object plane 19.

In contrast thereto, if the analyzer 31 is inserted into the beam path, which analyzer consists of two analyzer foils which are at right angles to each other with respect to their directions of transmission, respectively one foil half allows respectively one linearly polarized beam component to pass through so that, with only one focal adjustment, two differing object planes can be simultaneously sharply reproduced. This is particularly advantageous in positioning procedures in semiconductor technology.

It is self-evident that also a binocular can take the place of the ocular 23. However, in this case, the analyzer changer is suitably arranged in front of the splitting prism of the binocular.

Also, objective pairs of differing magnification can be employed which can be mounted, for example, on slides or turrets.

It is also possible to provide means for the continuous rotation of the polarizer 9. Thereby, a chronologically rapidly changing imaging of the left and right object fields is achieved. In the case where the rotational frequency is adjusted to the flicker frequency of the eye of the observer, image details which are different on the two object halves are emphasized. However, this leads to further possibilities of application for the novel split-field microscope, for example as a comparison microscope for criminological investigations, as an error-tracking device, a color comparison device, and other uses.

FIG. 2 shows the same apparatus, wherein the objectives are disposed as closely together as possible. For this purpose, the structural units 29, 30 were rotated by 180°, and the structural unit 29 was moved, together with the pentaprism 13, in the direction toward the central prism 10, and the structural unit 30 was moved together with the pentaprism 24 and the compensating prism 25 likewise in the same direction.

In FIGS. 3–6, additional embodiments are illustrated, wherein several details included in FIGS. 1 and 2 have been omitted for the sake of simplicity.

In FIG. 3, the pentaprism 13 is combined with the compensating prism 34 and the objective 16 with quarter-wave plate 17 into a fixed structural unit 36. The pentaprism 24 is combined with the compensating prism 25 and the objective 27 with the quarter-wave plate 28 into a structural unit 35. Both structural units 35, 36 are arranged to be displaceable with respect to the middle axis 12 of the central prism 10, with the beam path lengths being identical.

In FIG. 4, deviating prisms 37, 39 are disposed fixedly at the device, and the variation of the relative distances of the objectives 16, 27 is effected by shifting the structural elements 40, 16, 17 and 38, 27, 28 respectively, which are combined into the structural units 41 and 42 respectively.

In FIG. 5, an arrangement is shown wherein, in a double prism 43, the polarizing splitting layer 11 is arranged vertically. The beam-deflecting components consist of a pentaprism 24 and a deviating prism 50 with compensating plates 46, 47 cemented thereon. The structural elements, combined into units 48, 49 are arranged to be displaceable in the usual manner.

Another variant is indicated in FIG. 6. Here, the double prism, provided with a polarizing splitting layer 11, is mounted to be slidable to and fro with respect to the fixed illuminating beam axis 54 and the fixed tube axis 55. By means coupled mechanically with the reciprocating motion of the prism 43, the elements 50, 27, 28 on the one hand, and 51, 16, 17, on the other hand, combined into structural units 52, and 53, are shifted, in correspondence with the spreading of the beam.

We claim:

1. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprising the combination of:

a. said beam splitter comprising a polarizing beam splitter in said central prism along said optical axis for the simultaneous or alternative illumination of both said object fields by means of a rotatable polarizer;

b. first means deflecting a first polarized portion of said illuminating beam in the direction of said first objective;

c. second means deflecting a second polarized portion of said illuminating beam in a direction toward said second ojbective;
d. a first quarter-wave plate disposed in said first polarized portion between said polarizing beam splitter and a first object field through which said illuminating beam passes to the first object field and a first imaging partial beam passes backwards;
e. a second quarter-wave plate disposed in said second polarized portion between said polarizing beam splitter and a second object field through which said illuminating beam passes to the second object field and a second imaging partial beam passes backwards; and
f. an image-producing optical system connected between said polarizing beam splitter and said eyepiece in the direction of said first and second imaging partial beams, said optical system containing plano-parallel optical elements of an isotropic material, said elements removable from the beam path, said optical system reproducing said images of said object fields of the said same plane, axially offset on the viewing side.

2. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprisng the combination of:
a. said beam splitter comprising a polarizing beam splitter in said central prism along said optical axis for the simultaneous or alternative illumination of both said object fields by means of a rotatable polarizer;
b. first means deflecting a first polarized portion of said illuminating beam in the direction of said first objective;
c. second means deflecting a second polarized portion of said illuminating beam in a direction toward said second objective;
d. a first quarter-wave plate disposed in said first polarized portion between said polarizing beam splitter and a first object field through which said illuminating beam passes to the first object field and a first imaging partial beam passes backwards;
e. a second quarter-wave plate disposed in said second polarized portion between said polarizing beam splitter and a second object field through which said illuminating beam passes to the second object field and a second imaging partial beam passes backwards; and
f. an image producing optical system connected between said polarizing beam splitter and said eyepiece in the direction of said first and second imaging partial beams, said optical system containing plano-parallel optical elements of an anisotropic material, said elements rotatable in the beam path, said optical system reproducing said images of said object fields of said same plane, axially offset on the viewing side.

3. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprising the combination of:
a. said beam splitter comprising a polarizing beam splitter in said central prism along said optical axis for the simultaneous or alternative illumination of both said object fields by means of a rotatable polarizer;
b. first means deflecting a first polarized portion of said illuminating beam in the direction of said first objective;
c. second means deflecting a second polarized portion of said illuminating beam in a direction toward said second objective;
d. a first quarter-wave plate disposed in said first polarized portion between said polarizing beam splitter and a first object field through which said illuminating beam passes to the first object field and a first imaging partial beam passes backwards;
e. a second quarter-wave plate disposed in said second polarized portion between said polarizing beam splitter and a second object field through which said illuminating beam passes to the second object field and a second imaging partial beam passes backwards; and
f. an image-producing optical system connected between said polarizing beam splitter and said eyepiece in the direction of said first and second imaging partial beams, said optical system containing a plano-parallel optical element of an anisotropic material and an optical lens of an isotropic material, said plano-parallel optical element rotatable in the beam path, said optical system reproducing said images of said object fields of the said same plane, axially offset on the viewing side.

4. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprising the combination of:
a. said beam splitter comprisng a polarizing beam splitter in said central prism along said optical axis for the simultaneous or alternative illumination of both said object fields by means of a rotatable polarizer;
b. first means deflecting a first polarized portion of said illuminating beam in the direction of said first objective;
c. second means deflecting a second polarized portion of said illuminating beam in a direction toward said second objective;
d. a first quarter-wave plate disposed in said first polarized portion between said polarizing beam splitter and a first object field through which said illuminating beam passes to the first object field and a first imaging partial beam passes backwards;
e. a second quarter-wave plate disposed in said second polarized portion between said polarizing beam splitter and a second object field through which said illuminating beam passes to the second object field and a second imaging partial beam passes backwards; and f. an image-producing optical system connected between said polarizing beam splitter and said eyepiece in the direction of said first and second imaging partial beams, said optical system containing an optical lens of an anisotropic material, said optical lens rotatable in the beam path, said optical system reproducing said images of said object fields of the said same plane, axially offset on the viewing side.

5. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprising the combination of:

a. said beam splitter comprising a polarizing beam splitter in said central prism along said optical axis for the simultaneous or alternative illumination of both said object fields by means of a rotatable polarizer;

b. first means deflecting a first polarized portion of said illuminating beam in the direction of said first objective;

c. second means deflecting a second polarized portion of said illuminating beam in a direction toward said second objective;

d. a first quareter-wave plate disposed in said first polarized portion between said polarizing beam splitter and a first object field through which said illuminating beam passes to the first object field and a first imaging partial beam passes backwards;

e. a second quarter-wave plate disposed in said second polarized portion between said polarizing beam splitter and a second object field through which said illuminating beam passes backwards; and f. an image-producing optical system connected between said polarizing beam splitter and said eyepiece in the direction of said first and second imaging partial beams, said optical system containing a plano-parallel isotropic plate and an isotropic lens, said plano-parallel isotropic plate removable from the beam path, said optical system reproducing said images of said object fields of the same plane, axially offset on the viewing side.

6. In a split-field microscope having a central prism with a beam splitter, a first objective with a first aiming axis, a second parallel disposed objective with a second aiming axis, a common illuminating device producing an illuminating beam along an optical axis for both object fields, said objectives having a variable spacing of their optical axes, both forming images of said object fields, which are contained in the same plane, and an eyepiece, the improvement comprising the combination of:

a. said beam splitter comprising a polarizing beam splitter in said central prism along said optical axis for the simultaneous or alternative illumination of both said object fields by means of a rotatable polarizer;

b. first means deflecting a first polarized portion of said illuminating beam in the direction of said first objective;

c. second means deflecting a second polarized portion of said illuminating beam in a direction toward said second objective;

d. a first quarter-wave plate disposed in said first polarized portion between said polarizing beam splitter and a first object field through which said illuminating beam passes to the first object field and a first imaging partial beam passes backwards;

e. a second quarter-wave plate disposed in said second polarized portion between said polarizing beam splitter and a second object field through which said illuminating beam passes to the second object field and a second imaging partial beam passes backwards; and f. an image-producing optical system connected between said polarizing beam splitter and said eyepiece in the direction of said first and second imaging partial beams, said optical system containing at least one isotropic lens and an anisotropic crystalline lens, said isotropic lens removable from the beam path and said anisotropic crystalline lens rotatable in the beam path, said optical system reproducing said images of said object fields of the same plane, axially offset on the viewing side.

7. The split-field microscope according to claim 1, wherein said eyepiece has two lenses in spaced relationship along said optical axis and a linearly polarizing optical element is provided along said optical axis after said polarizing beam splitter, between said two lenses.

8. The split-field microscope according to claim 7, wherein said polarizing optical element comprises at least two polarizing foils arranged side by side and oriented at right angles to each other with respect to their transmission directions.

9. The split-field microscope according to claim 7, wherein a device for changing of the said polarizing optical element is provided comprising a first polarizing optical element consisting of two polarizing foils arranged side by side and oriented at right angles to each other with respect to their transmission directions and a second polarizing optical element consisting of one polarizing foil.

10. The split-field microscope accoridng to claim 7, wherein a drive is provided for the continuous rotation of the polarizing optical component.

11. The split-field microscope according to claim 1, wherein means are provided for varying the relative distances between the central axis of said central prism containing said polarizing beam splitter and said aiming axes of the objectives, said means for varying comprising a first structural unit, which contains a shifting lens, a first beam-bending component, said first objective and said first quarter-wave plate, means for rotating by 180° said first structural unit together with a first pentaprism, said pentaprism arranged between said central prism and said first structural unit, in the direction toward said central prism, and a second structural unit, which contains a second beam-bending component, said second objective and said second quarter-wave plate, means for rotating by 180° said second structural unit together with a second pentaprism, in the direction toward said central prism, said second pentaprism connected with a compensating prism and arranged between said central prism and said second structural unit.

12. The split-field microscope according to claim 1, wherein each objective forms, together with a forwardly associated beam-bending component and a quarter-wave plate connected thereafter, a structural unit; and each of said two structural units is disposed with variable orientation about the central axis of the polarized illuminating beam leaving the respective beam-bending component.

13. The split-field microscope according to claim 1, wherein a marker diaphragm is provided in the illuminating beam path, said marker diaphragm is insertable in an illuminating field stop, which is arranged between an aperture diaphragm and a lens of said objective.

* * * * *